Oct. 13, 1931.  R. A. TRIVELY  1,827,123
TRACTOR GUIDE
Filed Aug. 10, 1929  4 Sheets-Sheet 1

Inventor
R. A. Trively
By Arthur H. Sturges
Attorney

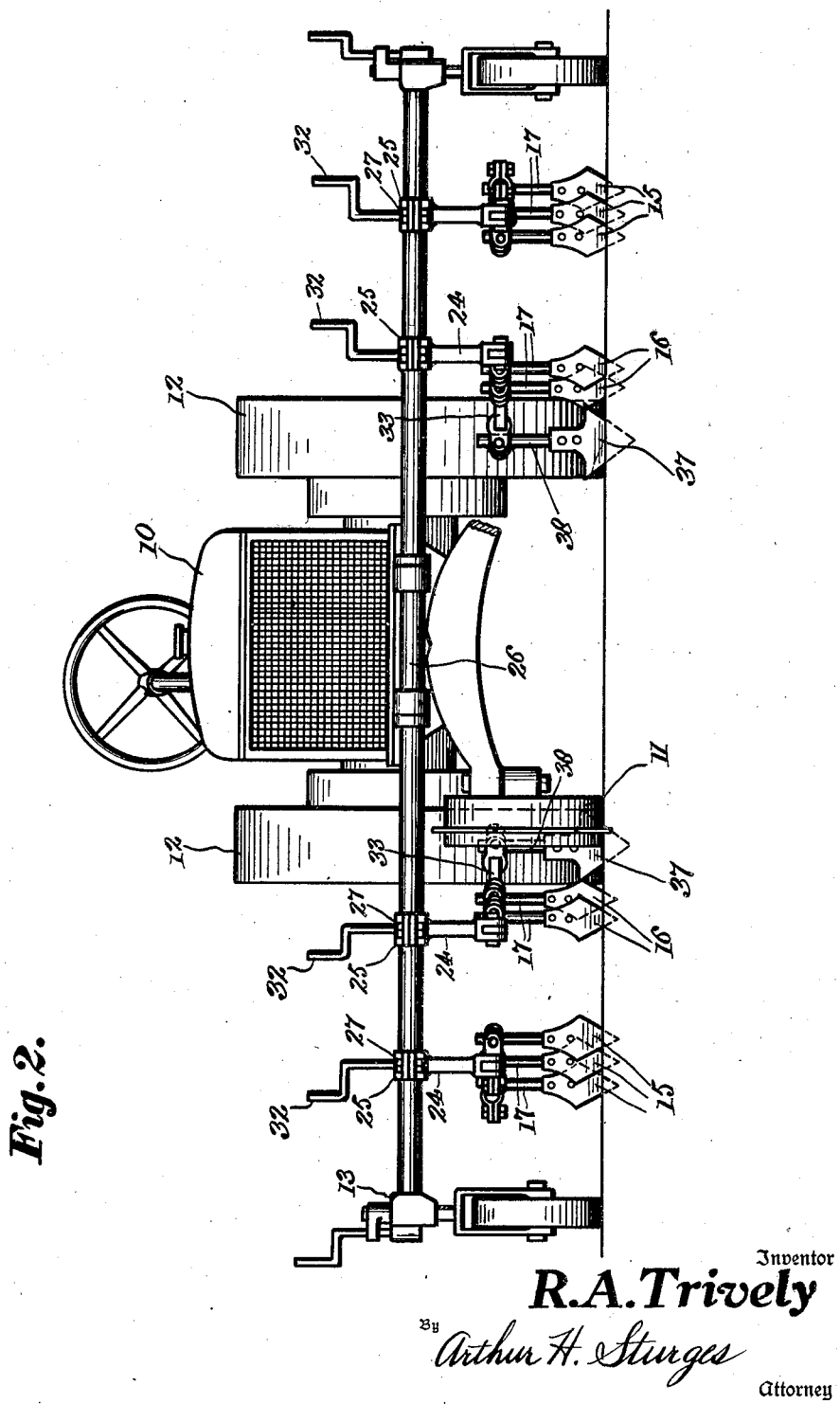

Oct. 13, 1931.  R. A. TRIVELY  1,827,123
TRACTOR GUIDE
Filed Aug. 10, 1929   4 Sheets-Sheet 3
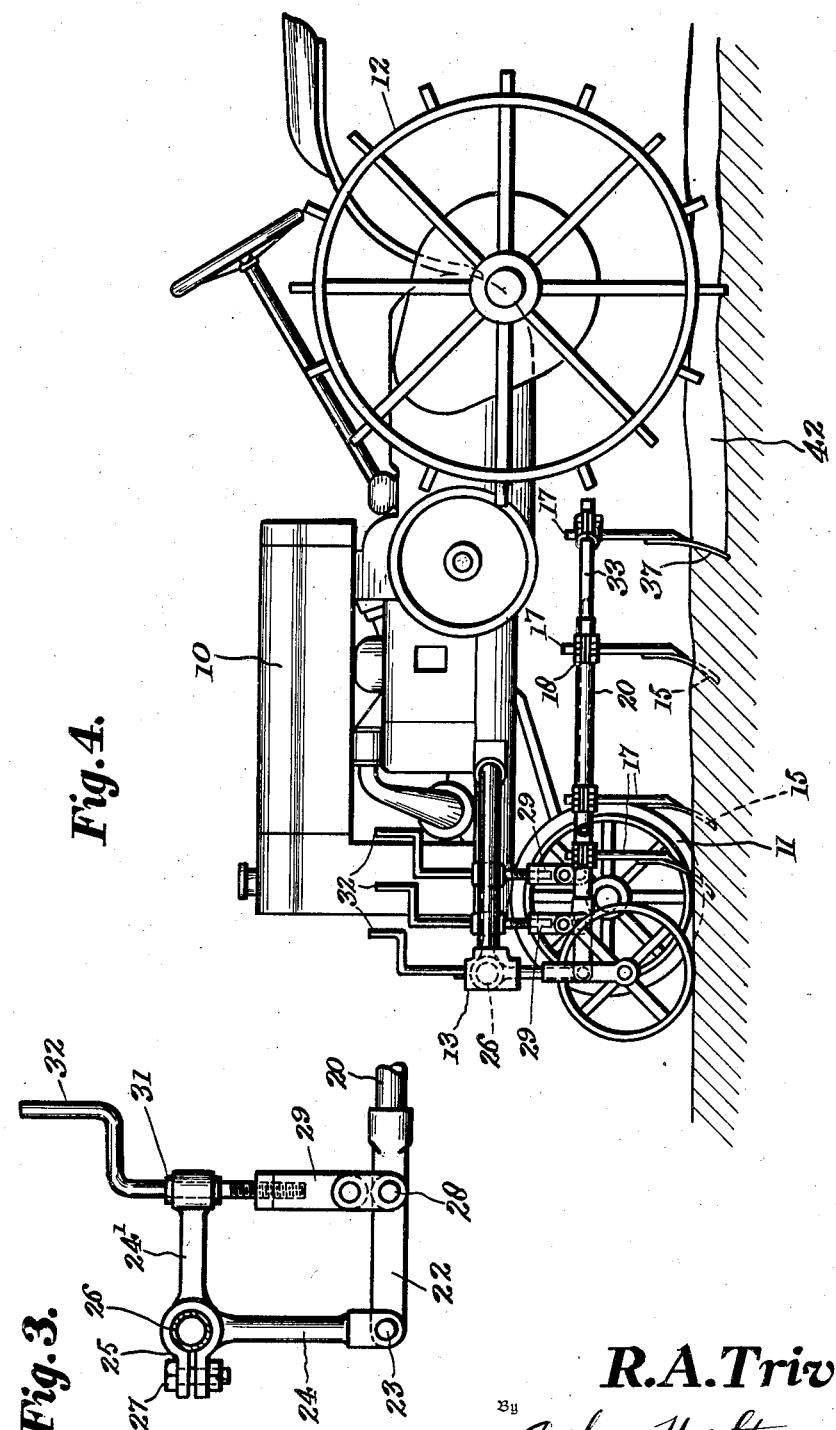
Inventor
R.A.Trively
By Arthur H. Sturges
Attorney Oct. 13, 1931.   R. A. TRIVELY   1,827,123
TRACTOR GUIDE
Filed Aug. 10, 1929   4 Sheets-Sheet 4
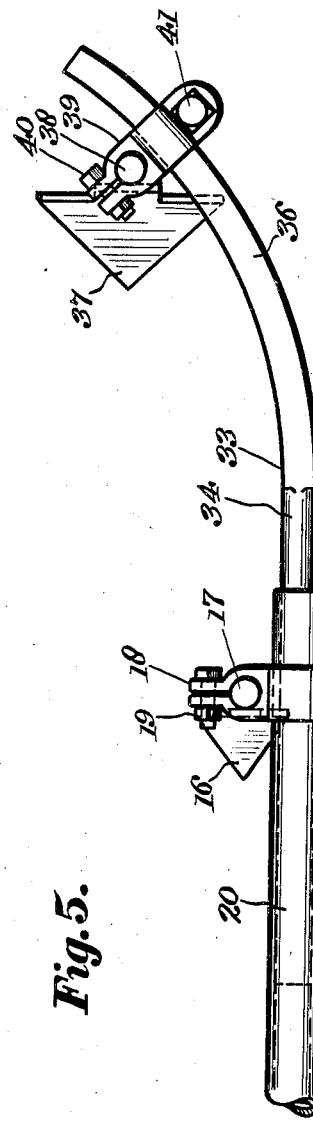
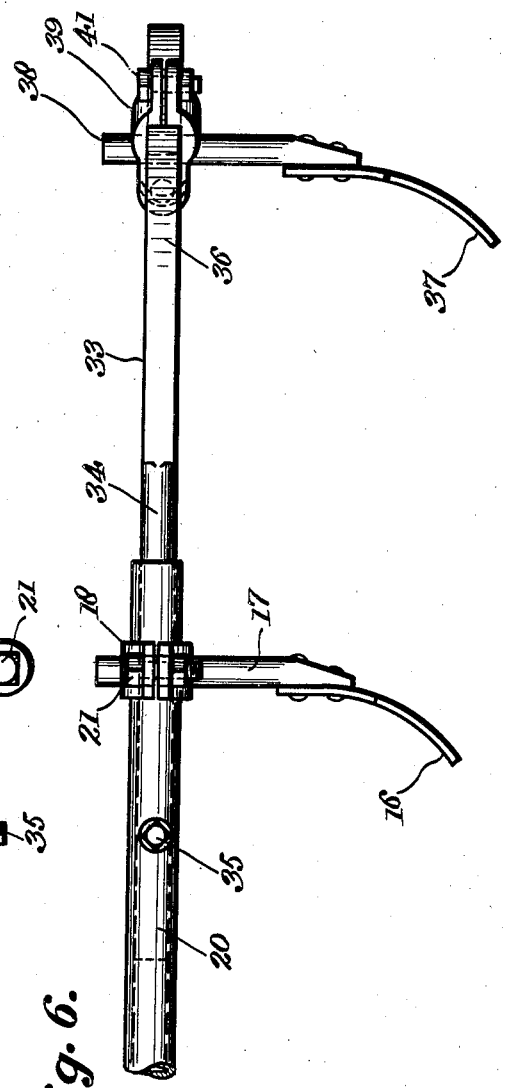
Fig. 5.
Fig. 6.
Inventor
R. A. Trively
By Arthur H. Sturges,
Attorney Patented Oct. 13, 1931

1,827,123

UNITED STATES PATENT OFFICE

ROLLAND A. TRIVELY, OF RANDOLPH, IOWA, ASSIGNOR TO DEERE & COMPANY, OF MOLINE, ILLINOIS, A CORPORATION OF ILLINOIS

TRACTOR GUIDE

Application filed August 10, 1929. Serial No. 385,035.

This invention relates to agricultural implements, and has relation more particularly to a device especially designed and adapted for use as a tractor guide.

It is an object of the invention to provide a device of this kind, which may be readily applied to and removed from a certain type of a corn cultivator implement, the latter being readily attached to and removed from a tractor.

Another object of the invention is to provide a device which is susceptible of certain adjustments both vertically and horizontally.

A further object of the invention is to provide an improved tractor cultivator, in which provision is made for cutting trenches in advance of the tractor driving wheels, whereby the wheels following the trenches will guide the tractor in the proper relation to the rows of plants to be cultivated.

A still further object of the invention is to provide an improved tractor cultivator in which additional cultivating shovels are provided of a wide construction spaced relatively to the driving wheels of the tractor, whereby to cut trenches for the wheels to follow in, such shovels being mounted for adjustment, whereby the trenches may be regulated as to depth and longitudinal position with respect to the wheels.

The invention consists in the details of construction and in the combination and arrangement of the several parts of the device whereby certain important advantages are attained and the art of cultivating corn rendered simpler and less expensive in accomplishment, as more fully set forth herein.

With the foregoing and other objects in view, the invention will be more fully described hereinafter, and will be more particularly pointed out in the claims appended hereto.

In the drawings, wherein like symbols refer to like or corresponding parts throughout the several views.

Figure 2 is a front elevation of the combination and arrangement of parts shown in Figure 1.

Figure 3 shows an enlarged detail of an adjusting mechanism for the new tractor guide device.

Figures 4 is a side elevation of the devices shown in Figure 1.

Figure 5 is an enlarged plan view of a detail of the new device as attached to a fragment of a corn cultivator part, and Figure 6 is a side view of the device shown in Figure 5.

Figure 1:
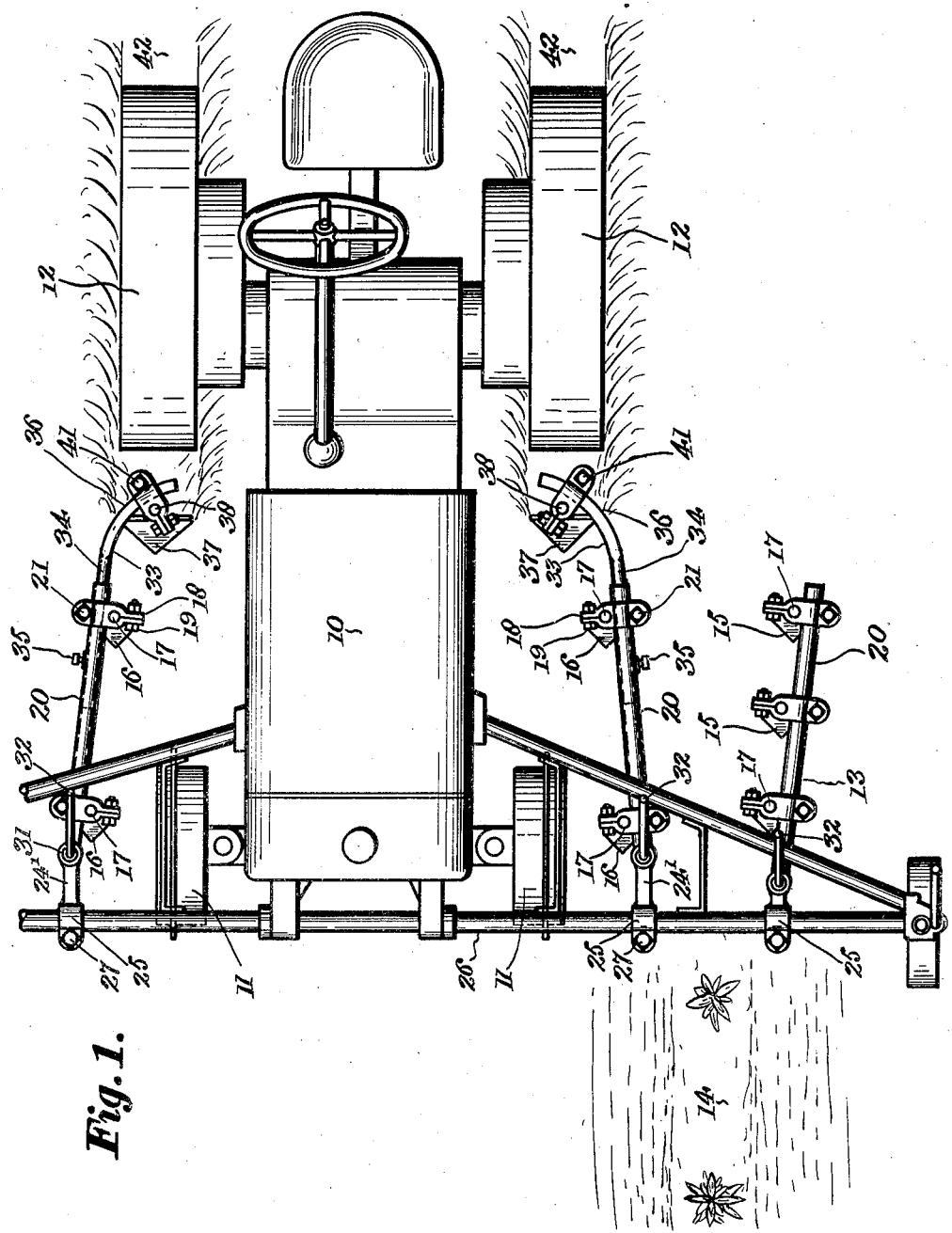
Figure 1 is a top plan view of a tractor having attached thereto a corn cultivator implement, the latter being partly broken away and showing the new device attached thereto.

From the following description it is thought to be obvious that a tractor guide, which is particularly useful in cultivating corn and constructed in accordance with my invention, is particularly well adapted for use by reason of the convenience and facility with which it may be assembled and operated, and it will also be obvious that my invention is susceptible of some change and modification without departing from the principle and spirit of the invention and for this reason I do not wish to be understood as limiting myself to the precise arrangement and formation of the several parts herein shown in carrying out my invention in practice except as hereinafter claimed.

Referring more particularly to the drawings, 10 indicates generally a tractor of any conventional type. The tractor is provided with the usual assemblage of an engine, steering wheel and an operator's seat, as well as front steering wheels 11 and rear traction or driving wheels 12. The foregoing parts relative to the tractor are conventional.

A corn cultivator is shown attached to the tractor in a well-known manner, said cultivator 13 being adapted to cultivate two rows of corn simultaneously. A row of corn is shown in Figure 1 and indicated by the numeral 14. As best shown in Figure 2, each row of corn is adapted to be cultivated by means of two gangs of plow shovels which are located on each side of a corn row, said shovels being indicated at 15 and 16 respectively. Each gang of cultivator shovels may consist of any desired number of shovels, preferably three. However, a greater or lesser number of shovels may be employed.

As best shown, in Figures 2, 5 and 6 each shovel 16 is attached to a vertically movable support 17, the latter being adapted to have sliding movements through a bifurcated clamp 18 which is provided with an adjusting bolt and nut 19 and it will be understood that when the nut is loosened the support 17 may be raised and lowered to a selected position for securing a desired elevation of the shovel point 16.

The clamp 18 is adapted to have sliding movements upon a pipe support 20 by loosening a clamping bolt 21 and in this manner the shovel points are adapted to be adjusted longitudinally of the cultivator device.

As best shown in Figure 3, the pipe support 20 is attached to a member 22 which in turn is pivotally attached as at 23 to a downwardly extending arm 24, the latter being a part of a casting which is bell-crank-shaped in form and is provided with a right angular extending portion 24', the latter normally projecting in a horizontal direction, said arms 24 and 24' preferably being integral with a bifurcated clamp portion 25 which is slidably mounted upon the main frame 26 of the cultivator. The clamp 25 is provided with an adjusting and positioning detent bolt and nut 27, and it will be understood that when the bolt 27 is loosened slidable movements may be imparted to the members 24 and 25 and by this means transverse adjustments of the gangs of plows may be made with respect to the main frame 26 of the cultivator, said main frame preferably being formed of tubular pipe.

The member 22 is pivotally secured as at 28 to a link 29 and the latter is threadedly connected to a rotatable shaft 30 which is adapted to have rotatable movements in and to be supported by a bushing 31 which is positioned upon the arm 24'. The shaft 30 is provided with a crank handle 32 and it will be understood that the operator may rotate the crank handle 32 and thereby raise and lower the pipe 20 and the plow points which are mounted upon said pipe 20.

As best shown in Figures 5 and 6 a rearwardly extending bar 33 is provided, the latter being preferably formed with a rounded forward portion 34 which is adapted to be received within and have slidable movements within the tubular pipe support 20 but may be adjustably locked therewith by means of a set-screw 35.

The main portion of the bar 33 is preferably formed square or rectangular at its rear end as indicated and shown at 36 and this squared portion 36 is preferably curved as shown in Figure 5 for purposes later described.

There is a comparatively wide shovel point 37 secured to the bar 36 by means of a standard 38 and a clamp 39, the latter being bifurcated and provided with a bolt 40 by means of which the standard 38 may be adjusted vertically. The clamp 39 is further provided with a bifurcated end and a second adjusting bolt and nut 41 by means of which longitudinal adjustments of the clamp may be made with respect to the square portion 36 of the bar 33 and it will be understood that the interior of the clamp 39 is formed rectangular and is adapted to register with the square portion 36 of the bar 33 in a manner whereby turning movements of the clamp and the shovel 37 are prevented.

As best shown in Figure 1 two shovel points 37 are provided and by means of the foregoing described adjustable means said shovel points 37 may be positioned directly in front of and in alignment with the rear driving or traction wheels of the tractor as shown in Figure 1. It will be understood that the shovel points 37 are substantially as wide as the tread of the tractor driving wheels 12 for purposes later described.

By the foregoing described means it will be understood that by operation of the crank handle 32 that the gangs of plows may be raised and lowered and that by operation of the movable clamp 25 upon the main frame 26 of the cultivator that said plows may be adjusted transversely of the mechanism. Similarly it will be understood that the plow points 37 may be adjusted to selected positions so that they are in alignment with the rear wheels 12 of the tractor as shown in Figure 1.

Heretofore in the practice of the art of cultivating corn with a two row tractor such as shown in the drawings and assuming that the ground being cultivated is slightly uneven or that the hardness of the soil varies in certain areas, the outermost gang of shovel points contacting with said hard soil will function as an anchor and tend to retard the forward movement of the vehicle and the cultivator with respect to the opposite end of the latter.

In other words, said outer gang of plows would function as an "anchor" and in a manner whereby it is difficult or practically impossible to steer the tractor directly in alignment with the rows of corn 14 being cultivated. The result of this is that the gangs of shovels would heretofore get out of alignment with respect to said rows of corn and the shovels would dig up the young sprouting grain instead of cultivating the weeds along the sides of said rows.

By means of the present invention, the shovels or points 37 will dig guide trenches 42 for the wheels 12 of the tractor. The trenches being of substantially the same width of the wheels, the side rims of the wheels will engage the sides of the trench 42 and such trench will form tracks wherein the wheels 12 are compelled to move in a straight line, thereby preserving the alignment of the cultivators and obviating the objections above noted.

In Figure 4 one shovel point 37 is shown as being so adjusted as to cut a trench 42 for the wheel 12 of the tractor. As the vehicle moves forward, the tread or rim of the wheel 12 will sink down into the trench 42 and will be consequently guided therein. Should a deeper or shallower trench become desirable, the standards 38 of the shovels 37 may be adjusted in the clamps 39 by loosening the bolt 40.

The curved rod 33 enables the shovels 37 to be suported at a position forwardly of the tractor wheels 12, while utilizing the support of the tubular rod 20 and at the same time not interfering with the proper positioning of the cultivating shovels 15 and 16. The clamp 39 may be adjusted along the curved bar 36 by loosening the nut 41 in order to shift the shovel 37 backwardly or forwardly with respect to the tractor wheel or to move the same slightly out of alignment with the wheel in order to give the tractor a tendency to slide laterally to one side or the other to counteract any pull made upon the tractor by the cultivating shovels as heretofore referred to.

I do not wish to be restricted to the size, form and proportions of the various parts, and obviously changes could be made in the construction herein described without departing from the spirit of the invention, it being only necessary that such changes fall within the scope of the appended claims.

What is claimed is:—

1. In a tractor guide, the combination with a tractor and a soil engaging implement, of a plow point secured to said implement and adjustable laterally thereon to position it in front of and in alignment with a traction wheel of said tractor, and means for raising and lowering said implement.

2. In a tractor guide, the combination with a tractor and an implement positioned at the forward portion thereof comprising an earth working tool, of a plow point spaced laterally from said earth working tool and adjustably secured to said implement to aline it with a traction wheel of the tractor, whereby upon a forward movement of the tractor said plow point is adapted to cut a trench in the soil for receiving and guiding the traction wheel of the tractor.

3. In a tractor guide, the combination with a tractor provided with front and rear wheels, of a cultivator secured to the tractor, comprising laterally adjustable gangs of earth working tools, a soil engaging shovel carried by the cultivator at each side of the tractor, said shovels being positioned forwardly of the traction wheels of the tractor, and means for adjusting the position of said shovels laterally with respect to the cultivator to bring said shovels directly forward of said traction wheels.

4. The combination with a tractor, and a cultivating implement propelled thereby, of a shovel carried by the implement and disposed directly in front of one of the traction wheels of the tractor to cut a trench substantially as wide as the tread of such traction wheel, in which said wheel may run to guide the tractor.

5. In a device of the class described, a tractor having traction wheels, and cultivating rigs carried by the tractor in advance of the traction wheels, said rigs including means for forming guide trenches for such traction wheels in the surface traversed.

6. In a device of the class described, a tractor having driving wheels, a cultivating rig carried by said tractor on each side thereof, and a shovel adjustably carried by each of said rigs directly in advance of the adjacent driving wheel for cutting a trench whereby the drive wheel will sink in the trench and be guided by the side walls thereof.

7. In combination with a tractor having driving wheels, of a cultivator attachment for said tractor having gangs of cultivating shovels disposed at opposite sides of the tractor, and laterally adjustable with respect thereto, and trench digging means carried by said cultivator attachment directly in front of the tractor driving wheels.

8. In a device of the kind described, a tractor having driving wheels, a cultivator attachment for the tractor, gangs of cultivating shovels supported by said attachment at both sides of the tractor, and laterally adjustable additional shovels of substantially the same width as the driving wheels of the tractor mounted and positioned whereby to cut trenches for the driving wheels to run in and to serve as guides therefor.

9. In a device of the kind described, a tractor having driving wheels, a cultivating attachment carried by the tractor, gangs of cultivating shovels supported by said attachment at opposite sides of the tractor, curved bars adjustably carried by said cultivator attachment and additional shovels carried adjustably by said curved bars in advance of the driving wheels whereby to cut trenches for the wheels to move in.

10. In a device of the kind described, a tractor having driving wheels, a cultivator attachment for the tractor, adjustable tubular supports on the attachment, gangs of cultivating shovels carried by said tubular support, curved bars adjustably telescoping in said tubular support, and additional cultivating shovels carried by said curved bars for cutting trenches in advance of the driving wheels whereby to guide the latter.

11. In a device of the kind described, a tractor having driving wheels, a cultivator bar attachment extending across in front of said tractor and secured thereto, tubular supports mounted for lateral and vertical adjustment on said bar, cultivator shovels adjustably carried on said tubular supports, curved bars adjustably telescoping in said tubular supports, and having rectangular rear portions, clamps having rectangular sockets received adjustably upon the rectangular portions of said curved bars, and trench digging shovels carried adjustably by said clamps and in advance of the driving wheels of the tractor whereby to dig trenches in which to guide said wheels.

12. In a device of the kind described, a tractor having driving wheels, a cross bar secured in front of said tractor, clamps secured for lateral adjustment to said cross bar, tubular supports extending rearwardly from the bar at the sides of the tractor and having a pivotal movement with respect to said bar, means for adjusting said supports vertically, gangs of cultivator shovels carried by said supports, curved bars slidably fitted with respect to said supports, clamps adjustable longitudinally of said curved bars, and shovels adjustably supported in said clamps, said last mentioned shovels adapted to dig trenches in which the driving wheels of the tractor move.

13. In a device of the class described, a tractor having driving wheels, a cultivating attachment at the forward end of the tractor, a gang of cultivating shovels supported by said attachment at each side of the tractor, means for adjusting said gangs laterally relative to the tractor, and means for laterally adjusting one of the shovels of each gang relative to the other shovels thereof to aline it with the adjacent driving wheel of the tractor.

14. In a device of the class described, a tractor having driving wheels, a cultivating attachment at the forward end of the tractor, a gang of cultivating shovels supported by said attachment at each side of the tractor, means for presenting lateral swinging of said gangs relative to the tractor, and means for adjusting one of the shovels of each gang relative to the other shovels thereof to aline it with the adjacent driving wheel of the tractor.

15. The combination with a tractor, and a cultivating implement propelled thereby, of a shovel carried by the implement and disposed directly in front of one of the traction wheels of the tractor to cut a trench substantially as wide as the tread of such traction wheel, in which said wheel may run to guide the tractor, said shovel being adjustable laterally with respect to the cultivating implement.

In testimony whereof, I have affixed my signature.

ROLLAND A. TRIVELY.